*Treadway & Warner,*
*Stop Cock,*
Nº 47,057. Patented Mar. 28, 1865
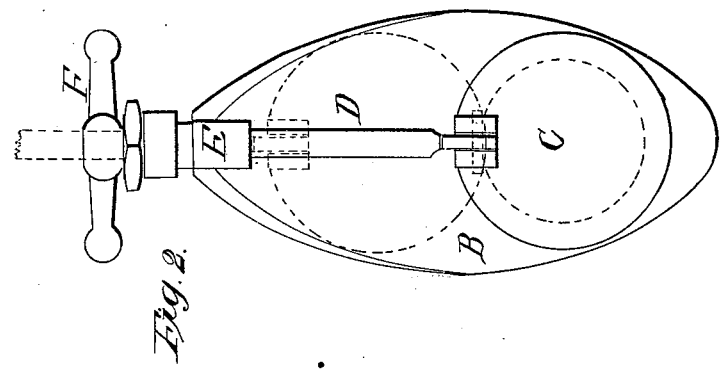
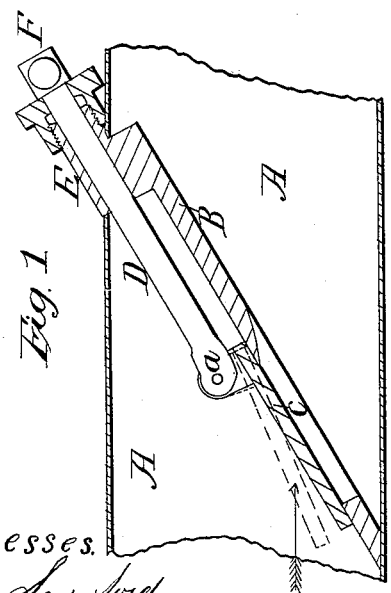
Witnesses.
Rufus Sanford
John E. Earle
Inventor.
A. H. Treadway
J. R. Warner

UNITED STATES PATENT OFFICE.

A. R. TREADWAY AND S. R. WARNER, OF NEW HAVEN, CONNECTICUT.

IMPROVEMENT IN VALVES FOR STEAM-PIPES.

Specification forming part of Letters Patent No. 47,057, dated March 28, 1865.

*To all whom it may concern:*

Be it known that we, A. R. TREADWAY and S. R. WARNER, of New Haven, in the county of New Haven and State of Connecticut, have invented a new and useful Improvement in Valves for Steam-Pipes; and we do hereby declare the following to be a full, clear, and exact description of the same, when taken in connection with the accompanying drawings, and the letters of reference marked thereon, and which said drawings constitute part of this specification, and represent, in—

Figure 1, a central section, and in Fig. 2 a face or top view, of a valve complete.

Our invention relates to improvements in valves for opening or closing the flow of steam, &c., in pipes, and is designed especially for use in tin pipes used for heating purposes. One of the greatest difficulties which we have experienced in the use of such pipe has arisen from cutting off the steam at a low point in the line of pipe while that part of the pipe beyond the cut-off was full of steam. (This is often necessary.) The steam therein contained quickly condenses, and of course flows down to the lowest part of the pipe, where the valve is situated, and as the valve is closed the water must remain there until such time as the valve is again opened.

This condensation, if the pipe is in an exposed position, (as it usually is,) freezes and bursts the pipe.

To overcome this difficulty is the object of our invention, which consists in constructing the valve so that while it shall cut the steam off and prevent its passage beyond said valve, the condensation, as it flows back against the opposite side of the valve, may open the valve sufficiently to flow through, thus forming a kind of steam-trap.

To enable others skilled in the art to construct and use our invention, we will proceed to fully describe the same, as illustrated in the accompanying drawings.

A represents a section of pipe; B, the valve-plate, of the form shown in Fig. 2, so as to lie diagonally across and fill the pipe A, as seen in Fig. 1. This construction of the valve-plate is the same as that invented by S. R. WARNER, herein named, for which he has applied for Letters Patent in even date herewith.

C is the valve; D, the valve-rod, extending up through the stuffing-box E, terminating in a handle, F. The valve C is hinged to the rod D at *a*, so that by pressure upon its under side it may be raised from its seat, as seen in red, Fig. 1. To open the valve, draw it up by means of the handle from the position in black, Fig. 2, to that in red. To close it, reverse the operation.

The flow of steam from the boiler in the pipe is toward the valve, as denoted by an arrow, Fig. 1. When the valve is open, the steam passes on through to the pipes above. If it be desirable to cut off the steam from the pipe beyond, close the valve. The steam in the pipes beyond the valve will quickly condense, and the water will flow back against the valve, and, were the valve firmly held to its seat, would fill the pipe at that low point, and, thus frozen, would burst the pipe, but being hinged, so as to open easily, the weight of the water will open it sufficiently to allow the water to flow through the steam by its own pressure, prevent its passing the valve, thus forming a valve which operates to a certain extent as a steam-trap.

Having, therefore, fully described our invention, what we claim as new and useful, and desire to secure by Letters Patent, is—

The hinged valve C, combined with an inclined seat, B, so as to operate substantially as and for the purpose specified.

A. R. TREADWAY.
S. R. WARNER.

Witnesses:
RUFUS SANFORD,
JOHN E. EARLE.